United States Patent [19]
Edelkind et al.

[11] Patent Number: 5,987,483
[45] Date of Patent: Nov. 16, 1999

[54] RANDOM NUMBER GENERATOR BASED ON DIRECTIONAL RANDOMNESS ASSOCIATED WITH NATURALLY OCCURRING RANDOM EVENTS, AND METHOD THEREFOR

[75] Inventors: Jamie Edelkind, Atlanta; Ilya M. Vitebskiy, Marietta, both of Ga.; Alexander Figotin, Charlotte, N.C.; Vadim Popovich, Marietta, Ga.

[73] Assignee: Leybold Systems GmbH, Hanau, Germany

[21] Appl. No.: 09/005,089

[22] Filed: Jan. 9, 1998

Related U.S. Application Data
[60] Provisional application No. 60/035,084, Jan. 13, 1997.

[51] Int. Cl.$^6$ ........................................................ G06F 1/02
[52] U.S. Cl. ............................................ 708/250; 708/255
[58] Field of Search .................................. 708/250, 251, 708/252, 253, 254, 255, 256

[56] References Cited

U.S. PATENT DOCUMENTS

| | | | |
|---|---|---|---|
| 4,545,024 | 10/1985 | Maher et al. | 708/255 |
| 4,574,311 | 3/1986 | Resnikoff et al. | 348/315 |
| 5,696,828 | 12/1997 | Koopman, Jr. | 380/46 |

*Primary Examiner*—Ohuong Dinh Ngo
*Attorney, Agent, or Firm*—Needle & Rosenberg, P.C.

[57] ABSTRACT

A random number generator based on naturally occurring events in which directional randomness of radioactivity is exploited to generate a random number sequence. Radiation emissions from a radiation source are detected at different spatial locations about the radiation source. A unique numerical value is assigned to radiation detected at the different spatial locations. A random number sequence comprising numerical values is generated depending upon which spatial location radiation is detected.

17 Claims, 4 Drawing Sheets

5,987,483

RANDOM NUMBER GENERATOR BASED ON DIRECTIONAL RANDOMNESS ASSOCIATED WITH NATURALLY OCCURRING RANDOM EVENTS, AND METHOD THEREFOR

This application claims the benefit of U.S. provisional application Serial No. 60/035,084, filed Jan. 13, 1997.

BACKGROUND OF THE INVENTION

Many applications of mathematical statistics in economics, cryptography, science, technology, etc., employ different kinds of long random number sequences. In some cases, the reliability of statistical analysis is directly related to the "quality of randomness" of the random numbers used.

There are several standard random distributions, such as, Poisson, Bernoulli, etc., each of which can be converted to another. These standard distributions relate to truly random processes, meaning the absence of a statistical correlation between different events or numbers no matter how close or distant from one other they are. Thus, the quality of a random number generator is defined by the proximity of its output to one of these standard truly random distributions.

Generally, random number generators fall into two large categories, algorithmic or physical. An algorithmic random number generator is based on a deterministic mathematical algorithm. The common problem with all algorithmic generators is that according to Kolmogorov's theory of complexity, to generate N truly independent random binary digits, at least $2^N$ operations must be executed. From a practical point of view, this means that an extremely large number of operations are required even for a moderately sized random number, N. Since existing algorithmic random number generators produce long pseudorandom sequences in a matter of seconds, their complexity is relatively low, and consequently their output sequences are far from truly random. This problem cannot be solved within the framework of an algorithmic approach, and this is why the sequence produced by an algorithmic random number generator is pseudorandom rather than random. In some cases, using a pseudorandom sequence results in misleading analytical conclusions, particularly when large fluctuations of the random inputs make the decisive contribution to the final result.

This does not mean, however, that algorithmic random number generators are useless. The overwhelming advantage of mathematical random number generators compared to almost any kind of natural one is low cost and portability. Many software packages have built-in random number generating capabilities and do not require specialized hardware. The pseudorandom number sequences generated by algorithmic random number generators are suitable for certain applications. Nevertheless, there are applications which require a relatively long string of random numbers without detectable correlations. Furthermore, since an algorithmic "absolute test of randomness" is impossible by definition, the impact of the persistent long-range correlations on the statistical analysis results may become unpredictable, no matter how sophisticated the underlying algorithm is.

By contrast, a natural, or physical random number generator is based on naturally occurring random phenomena, such as thermodynamic or quantum fluctuations, radioactive decay, etc. A radioactive decay is a natural process ideally suited as a source of randomness. Each and every event of a spontaneous radioactive decay does not depend on any external conditions, such as, the quantum state of atomic electrons, presence of other atoms or electromagnetic fields, ambient chemistry, temperature, etc. In this respect, spontaneous radioactive decay is unique. Different kinds of physical random number generators including those based on radioactive decay are known in the art. However, there is room for improvement.

There are two major problems with all existing physical random number generators based on natural radioactive decay. First, the total number of unstable nuclei in a radioactive source gradually decreases in time and so does the mean radiation event frequency. Second, the Poisson time distribution of the events only applies to those ideal sources which display neither secondary radioactive decay, nor any kind of induced radiation which could be later mistaken for a primary radioactive decay. Otherwise, different events, such as the primary and the secondary radioactive decays, become related to one other and thereby correlated in time. These same problems exist in any natural random generator utilizing temporal randomness. The possible physical solution for the above two problems is to utilize a directional randomness of a natural radioactive decay, rather than the temporal randomness. The directional randomness implies that the direction of propagation of emitted radiation produced by individual events is a perfectly random characteristic of the process.

Since it is desirable to provide a random number generator that is designed to eliminate both short and long term correlations in the output, utilizing directional randomness of the physical (natural) process is an appropriate way to solve these problems of the prior art.

SUMMARY OF THE INVENTION

Briefly, the present invention is directed to a random number generator exploiting directional randomness associated with radioactive decay. The random number generator according to the present invention detects radiation emissions from a localized radiation source at different spatial locations about the radiation source. A unique numerical value is assigned to radiation detected at the different spatial locations. A random number sequence is generated comprising numerical values depending upon which spatial location radiation is detected.

The objects and advantages of the present invention will become more readily apparent when reference is made to the following description taken in conjunction with the accompanying drawings.

DETAILED DESCRIPTION OF THE DRAWINGS

Figure 1:
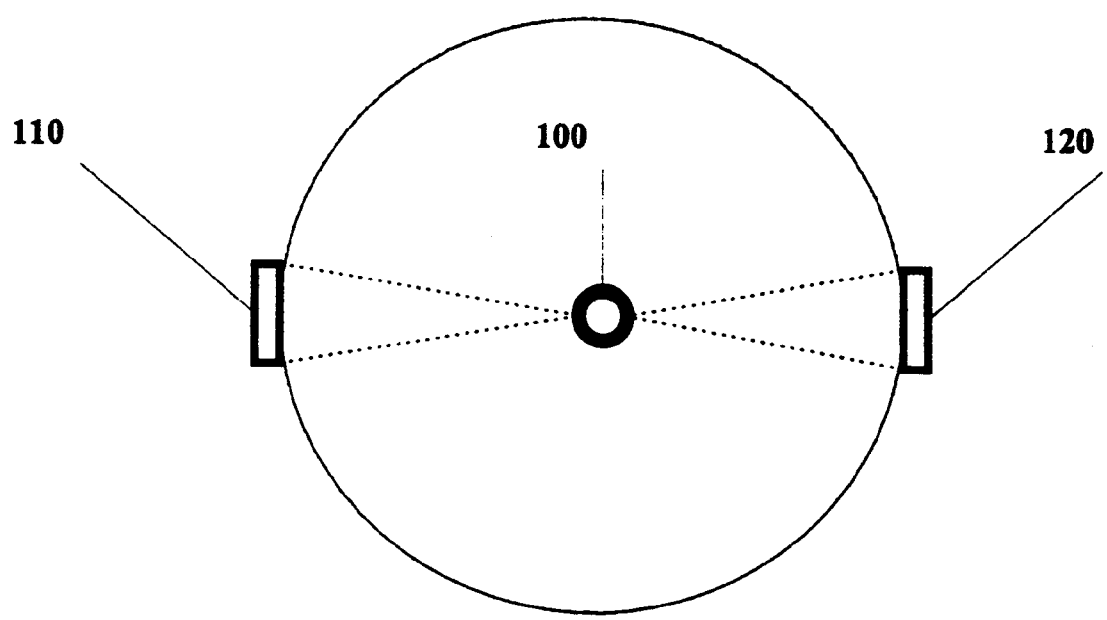
FIG. 1 is a diagram showing a plurality of radiation detectors spatially positioned about a radiation source for use in a spatially resolved (i.e., directional) random number generator according to the present invention.

Referring first to FIG. 1, the fundamental components for a spatially resolved random number generator according to the present invention are shown, including a radiation source 100 and at least two radiation detectors 110 and 120 positioned at spatial locations about the radiation source 100. The radiation detectors can be placed at any position in three-dimensional space about the radiation source 100 so long as they do not spatially overlap. That is, they are separated or spaced apart from each other so that a single radiation emission is not detected by more than one detector. Furthermore, the radiation detectors need not be perfectly identical to each other.

By placing the radiation detectors at various spatial positions about the radiation source, the directional randomness of radioactive emissions is exploited. The direction of propagation of emitted radiation produced by individual radiation events is a perfectly random characteristic of the process regardless of the presence of secondary radioactive decay and/or induced radioactive emission. Therefore, unlike prior art natural random number generators which are based solely on the temporal randomness of radioactive emissions, a natural random number generator based on directional randomness generates a random number sequence free from the correlations caused by the secondary radioactive decay and/or induced radioactive emission from the source. This overcomes the deficiencies of the prior art natural random number generators.

Figure 2:
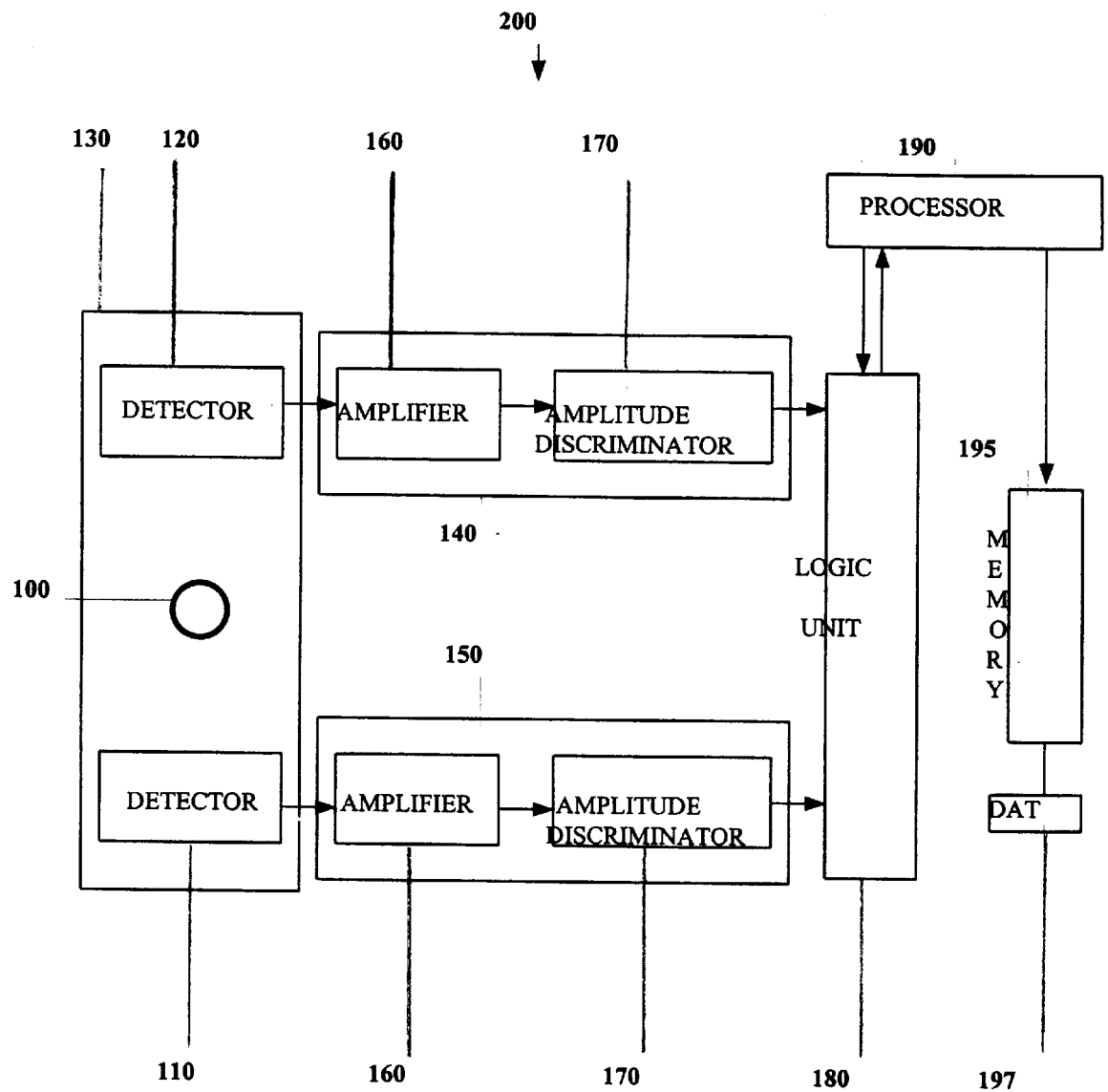
FIG. 2 is a block diagram of a spatially resolved random number generator according to the present invention.

FIG. 2 shows a spatially resolved random number generator 200 according to the present invention. The random number generator 200 shown in FIG. 2 includes two radiation detectors merely for explanatory purposes. It should be understood by those with ordinary skill in the art that, in practice, it will comprise as many radiation detectors as it is technically possible, such as thousands.

The radiation source 100 and the radiation detectors 110 are contained within a protective housing 130. The protecting housing 130 contains the radioactive emissions from the radiation source 100, and also prevents external radiation from being detected by the radiation detectors.

The radiation source 100 can be one of many types known in the art. For example, a single unlicensed source of approximately 10 $\mu$Ci that yields $3.7 \times 10^5$ decays per second is suitable. The radiation source 100 may be an alpha-decay or beta-decay isotope. A radiation emission consists of a primary radioactive decay, which may be accompanied by secondary radioactive decay as well as by the emission of induced radiation by radioactive and non-radioactive atoms.

The detectors 110 and 120 are embodied as photomultiplier tube/photodiode assemblies, semiconductor detectors, proportional counters or other detectors well known in the art. The type of detector selected is based on efficiency of detection and fast time resolution detection capability.

For each detector in the random number generator 200, there is a signal processing channel. For example, in the example shown in FIG. 2 there is a signal processing channel 140 for detector 120 and a signal processing channel 150 for detector 110. Each signal processing channel converts radiation detection events by a corresponding radiation detector to a standard electrical pulse.

Specifically, each signal processing channel 140 and 150 comprises an amplifier stage 160 and an amplitude discriminator 170. The amplifier stage 160 comprises a pre-amplifier and an amplifier to amplify and shape the electrical pulse output by the detector for further processing. The amplitude discriminator 170 outputs a standard logical signal (a pulse of a certain amplitude, shape, and duration) in response to the detection of radiation by the associated radiation detector. The parameters of the particular amplitude range are set based upon experimentation and set-up phases, and may vary for different radioactive isotopes. The amplitude discriminator 170 outputs a pulse of a certain amplitude in response to the detection of a radiation emission of an associated radiation detector.

A logic unit 180 is connected to the output of each signal processing channel 140 and 150. The logic unit 180 is a block of digital logic circuits designed to output a numerical value corresponding to which signal processing channel an electrical pulse is received. That is, the logic unit 180 assigns a unique numerical value to an occurrence of radiation at the different spatial locations. The random number sequence is derived from a series of these numerical values.

A processor 190 is coupled to the logic unit 180 and controls the logic unit 180 to reset a sequence generation process, adjust the sequence generation parameters, and control the transfer of the random number sequence to a memory device 195. The processor 190 is a standard integrated microprocessor having a sufficient processing speed, such as $10^5$ to $10^7$ Hz. A data access terminal (DAT) 197, such as a standard computer bus, is connected to the memory 195 to transfer the random number sequence to another device or system for use.

Figure 3:
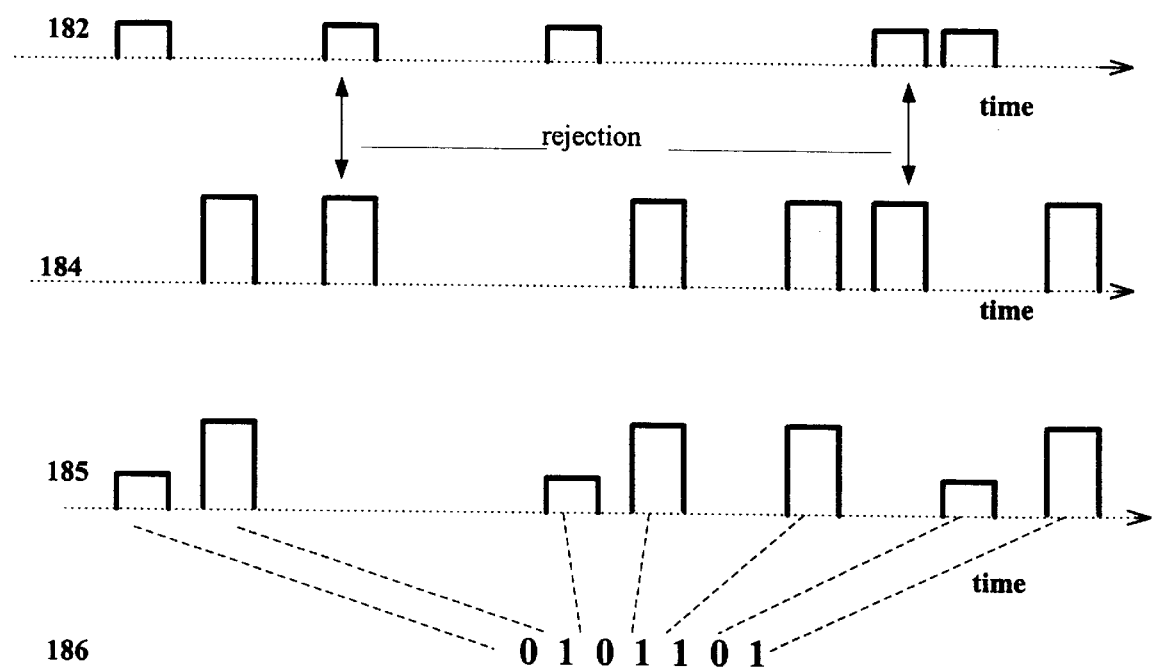
FIG. 3 is a timing diagram showing how a random binary sequence is generated by the random number generator according to the present invention.

With reference to FIG. 3, the stream of electrical pulses output by the signal processing channel 140 is shown at 182 and the stream of electrical pulses output by the signal processing channel 150 is shown at 184. The streams of electrical pulses 182 and 184 from the different signal processing channels are shown as having different amplitudes only for purposes of explanation, so as to distinguish them from each other. Each electrical pulse corresponds to a radiation detection event at a spatial location about the radiation source, and is assigned a unique numerical value, which, for example, is a digital value comprising at least one bit. For example, for two radiation detectors, a radiation detection event at one of the detectors is assigned a logic "1" and the radiation detection event at the other detector is assigned a logic "0". The logic unit 180 outputs a digital value depending upon on which signal processing channel an electrical pulse is received. In the event that electrical pulses output by the signal processing channels occur within a predetermined time period of each other, it becomes difficult for the logic unit 180 to distinguish from which signal processing channel the electrical pulse is received. Therefore, the logic unit 180 inhibits output of a numerical value for both electrical pulses if they are received within the predetermined period of time of each other. This eliminates any potential correlation between the two signal processing channels. The logic unit 180 outputs a random number sequence 186 which may be a random binary sequence or another type of random number sequence. The random number sequence 186 is an example of a random binary sequence of logic "1's" and logic "0's".

The number of bits for each digital value associated with a radiation detection event by a particular radiation detector is determined by the number of radiation detectors positioned about the radiation source. For example, if radiation events are detected at eight different spatial locations about the radiation source (by eight radiation detectors), then a unique 3-digit binary number (digital value) is assigned to each spatially resolved detection event. Specifically, a radiation detection event is assigned one of the following 8 numbers: 000, 001, 010, 011, 100, 101, 110, and 111.

By exploiting the directional randomness of natural radioactive emissions, the randomness of the resulting binary sequence is significantly better than that of a natural random number generator based solely on the temporal randomness of radioactive decay.

One random number distribution is a Bernoulli sequence of statistically independent binary digits, "0's" and "1's". The spatially resolved random number generator according to the present invention generates a Bernoulli random number sequence better than prior art physical random number generators as well as algorithmic random number generators. This is achieved even when the average intensity of the source varies in time, as well as when some of the individual emission events are correlated in time due to the presence of secondary and induced radiation. Unlike temporal randomness associated with radioactive decay, directional randomness persists even in the presence of secondary radioactive decay events, as well as in the presence of induced radiation. An advantage of a spatially resolved random number generator according to the present invention is that isotopes of relatively short half-lives can be used.

A special case of the Bernoulli sequence is a symmetric Bernoulli sequence, which is a Bernoulli sequence in which the probability of a "1" or "0" is ½. For such a sequence, the probability of the next number in the sequence being a "1" or "0" is the same, and the probability of any specific subsequence of "0's" and "1's" of length n is $2^{-n}$. The symmetric Bernoulli sequence is perfectly random and can be easily converted to any other standard random number distribution.

For those applications which require a symmetric Bernoulli sequence, a symmetrizer algorithm can be applied to the output of the random number generator 200. The symmetrizer algorithm is implemented by a software program executed by the processor 190 (FIG. 2). An example of a simple symmetrizer algorithm is as follows. The bits output by the random number generator 200 are split into non-overlapping blocks of 2 bits. The 2 bit block "01" is assigned an output of "0", and the 2 bit block "10" is assigned an output of "1". The 2 bit blocks "00" and "11" generate no corresponding output. Thus, if the input sequence to the symmetrizer is an asymmetric Bernoulli sequence, then the output is a symmetric Bernoulli sequence.

Figure 4:
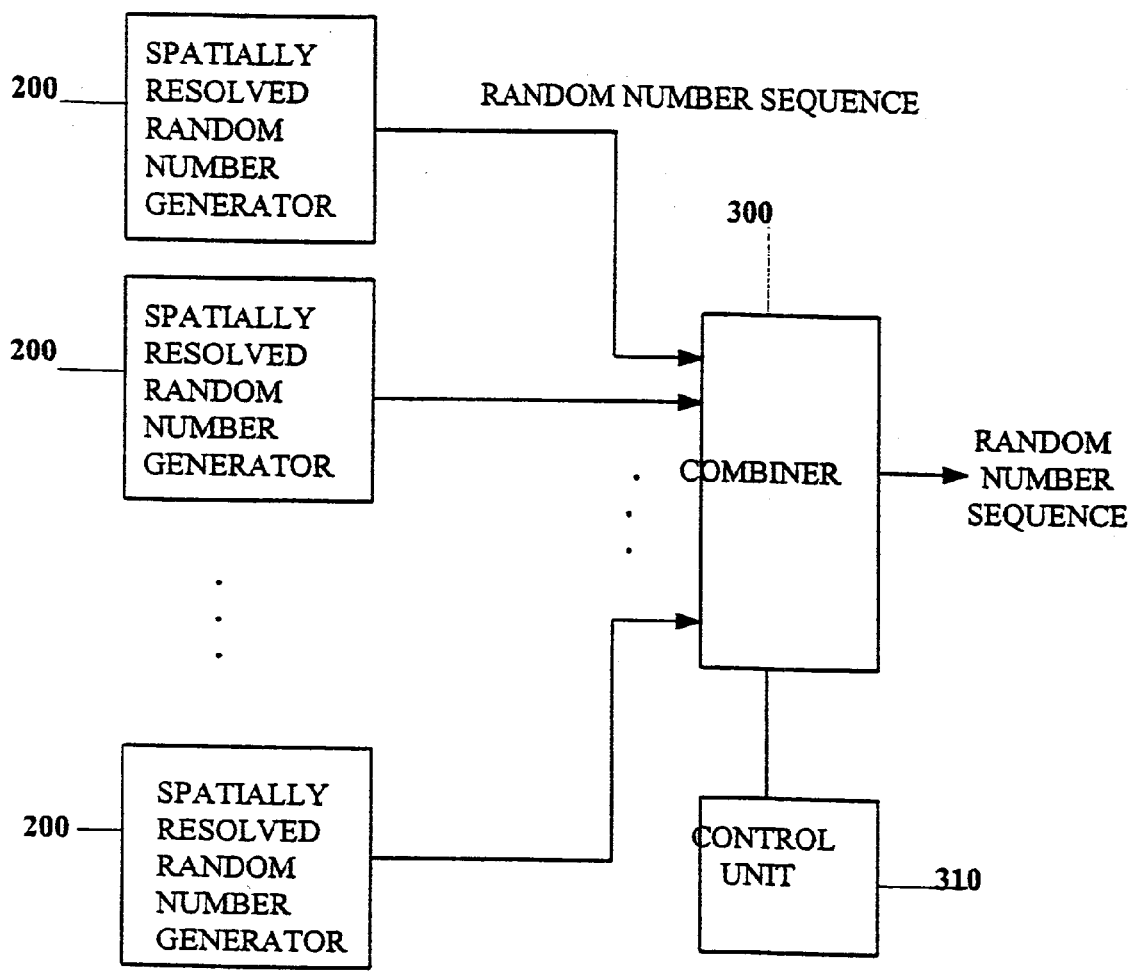
FIG. 4 is a block diagram of a random number generator comprising a plurality of spatially resolved random number generators according to the present invention.

The basic principles of the random number generator shown in FIG. 2 can be generalized to a random number generator comprising a plurality of spatially resolved random number generator modules. For example, as shown in FIG. 4, a plurality of spatially resolved random number generators 200 are provided and the random number sequence output by each is combined by a combiner 300 to form a combined random number sequence. The combiner 300 is controlled by a control unit 310. The control unit is a microprocessor or computer, for example, that is controlled by a software program to control how the combiner 300 combines the individual random number sequences output by each spatially resolved random number generator 200. The combiner 300 is a multiplexer, for example, and can be controlled to select for output the random number sequences in any manner to generate a random number sequence therefrom. The randomness of the combined random number sequence will be maintained since the output of each of the individual modules is not affected by the output of the others.

In summary, the random number generator according to the present invention involves detecting radiation emissions from a radiation source at different spatial locations about the radiation source; assigning a unique numerical value to detection of radiation at the different spatial locations; and generating a random number sequence comprising numerical values depending upon which spatial location radiation is detected. Optionally, the random number sequence is symmetrized with a symmetrizer algorithm to produce a symmetric random number sequence (e.g., the standard Bernoulli distribution).

The above description is intended by way of example only and is not intended to limit the present invention except as set forth in the following claims.

What is claimed is:

1. A random number generator based on naturally occurring events, comprising:
   a radiation source;
   a plurality of detectors for detecting radiation emitted by the source, the detectors being spatially positioned about the radiation source and separated from each other so that any single radiation emission can be detected by only one detector;
   a plurality of signal processing channels each coupled to a corresponding one of the plurality of detectors, each signal processing channel converting radiation detected by a corresponding detector to an electrical pulse; and
   a logic unit coupled to the plurality of signal processing channels and responsive to electrical pulses to output a random number sequence comprising a series of values corresponding to which signal processing channel an electrical pulse is received.

2. The random number generator of claim 1, wherein the logic unit outputs a series of digital values of at least one bit corresponding to which signal processing channel an electrical pulse is received.

3. The random number generator of claim 2, wherein the logic unit outputs a series of digital values each comprising a plurality of bits corresponding to which signal processing channel an electrical pulse is received.

4. The random number generator of claim 1, wherein the logic unit inhibits output of a numerical value if at least two electrical pulses are received from two signal processing channels within a predetermined period of time.

5. A method for generating a random number sequence comprising steps of:
   detecting radiation emissions from a radiation source at different spatial locations about the radiation source;
   assigning a unique numerical value to detection of radiation at the different spatial locations; and
   generating a random number sequence comprising numerical values depending upon which spatial location radiation is detected.

6. The method of claim 5, and further comprising a step of inhibiting output of a numerical value if radiation from two different spatial locations is detected within a predetermined period of time.

7. The method of claim 5, wherein the step of assigning a unique numerical value comprises assigning a digital value comprising at least one bit.

8. The method of claim 5, and further comprising the step of symmetrizing the random number sequence to produce a symmetric random number sequence.

9. A random number generator based on naturally occurring events, comprising:
   a radiation source;
   detecting means for detecting radiation emissions at different spatial locations about the radiation source;
   converting means for converting radiation detected at any one of the different spatial locations to an electrical pulse; and
   logic means coupled to the converting means and responsive to electrical pulses output by the converting means to output a random number sequence comprising a series of values corresponding to which spatial location radiation is detected.

10. The random number generator of claim 9, wherein the detecting means comprises a plurality of radiation detectors positioned about the radiation source and spaced apart from each other so that any single radiation emission can be detected by only one radiation detector.

11. The random number generator of claim 9, wherein the logic means outputs a series of digital values of at least one bit corresponding to which spatial location radiation is detected.

12. The random number generator of claim 9, wherein the logic means inhibits output of a numerical value if at least two electrical pulses are received within a predetermined period of time.

13. The random number generator of claim 9, and further comprising processing means for symmetrizing the random number sequence to produce a symmetric random number sequence.

14. A random number generator comprising:
   a plurality of generator modules each comprising:
   (a) a radiation source;
   (b) detecting means for detecting radiation emissions at different spatial locations about the radiation source;
   (c) converting means for converting radiation detected at any one of the different spatial locations to an electrical pulse; and
   (d) logic means responsive to electrical pulses output by the converting means to output a random number sequence comprising a series of values corresponding to which spatial location radiation is detected;
   combining means coupled to each generator module for combining the random number sequences output by each generator module to form a combined random number sequence.

15. The random number generator of claim 14, wherein the detecting means comprising a plurality of radiation detectors positioned about the radiation source and spaced apart from each other so that any single radiation emission can be detected by only one radiation detector.

16. The random number generator of claim 14, wherein the logic means outputs a series of digital values of at least one bit corresponding to which spatial location radiation is detected.

17. The random number generator of claim 14, wherein the logic means inhibits output of a numerical value if at least two electrical pulses are received within a predetermined period of time.

\* \* \* \* \*